(12) United States Patent
Räsänen et al.

(10) Patent No.: US 11,383,473 B2
(45) Date of Patent: Jul. 12, 2022

(54) DEEP-DRAWN PAPER TRAY, A METHOD AND AN APPARATUS FOR MAKING IT, AND A TRAY-FORMED PRODUCT PACKAGE

(71) Applicant: STORA ENSO OYJ, Helsinki (FI)

(72) Inventors: Jari Räsänen, Imatra (FI); Niilo Pöyhönen, Helsinki (FI); Mari Hiltunen, Imatra (FI); Outi Kylliäinen, Imatra (FI)

(73) Assignee: STORA ENSO OYJ, Helsinki (FI)

( * ) Notice: Subject to any disclaimer, the term of this patent is extended or adjusted under 35 U.S.C. 154(b) by 106 days.

(21) Appl. No.: 16/149,556

(22) Filed: Oct. 2, 2018

(65) Prior Publication Data

US 2019/0054714 A1 Feb. 21, 2019

Related U.S. Application Data (62) Division of application No. 14/385,011, filed as application No. PCT/FI2013/050296 on Mar. 15, 2013, now Pat. No. 10,118,360.

(30) Foreign Application Priority Data

Mar. 19, 2012 (FI) .................................. 20125304

(51) Int. Cl.
*B31B 50/44* (2017.01)
*B65D 75/32* (2006.01)
(Continued)

(52) U.S. Cl.
CPC ............... *B31B 50/44* (2017.08); *B65D 1/26* (2013.01); *B65D 1/34* (2013.01); *B65D 75/326* (2013.01);
(Continued)

(58) Field of Classification Search
CPC ..... B29C 51/08; B29C 51/082; B29C 51/087; B29C 51/22; B29C 51/24;
(Continued)

(56) References Cited

U.S. PATENT DOCUMENTS 1,074,989 A 10/1913 Stratton
1,431,175 A 10/1922 Edward et al.
(Continued)

FOREIGN PATENT DOCUMENTS

DE 24 51 511 5/1976
EP 0156000 A2 10/1985
(Continued)

OTHER PUBLICATIONS

Taiwanese Office Action for Taiwanese Patent Application No. 102109205, dated Nov. 7, 2016.
(Continued)

*Primary Examiner* — Robert F Long
*Assistant Examiner* — Eduardo R Ferrero
(74) *Attorney, Agent, or Firm* — Patterson Thuente Pedersen, P.A.

(57) ABSTRACT

A deep-drawn paper tray made of paper material, a method and an apparatus for manufacturing the tray, and a closed product package comprising the tray. The tray having a bottom and upwardly expanding side walls around the bottom, the side walls of the tray being shaped to expand through a plurality of circumferential steps dimensioned low enough for obtaining wrinkle-free side walls for the tray. The outermost step is a flat, wrinkle-free rim flange, which enables liquid and gas proof heat-sealing of a lid to form the package. The apparatus may comprise upper and lower moulding tools with concentric movable frames for forming the tray bottom and side wall steps from paper blanks, and moulding tools may be mounted onto a rotating turret (Continued)

carrying a paper blank through working stations arranged along the turret circumference, to shape the tray bottom and the side wall steps at the consecutive stations.

15 Claims, 4 Drawing Sheets

(51) Int. Cl.
| | |
|---|---|
| *B65D 1/26* | (2006.01) |
| *B65D 1/34* | (2006.01) |
| B29C 51/24 | (2006.01) |
| B29C 51/08 | (2006.01) |
| B29L 31/00 | (2006.01) |
| B29K 311/12 | (2006.01) |
| B29C 51/22 | (2006.01) |
| B31B 50/59 | (2017.01) |

(52) U.S. Cl.
CPC .......... *B29C 51/08* (2013.01); *B29C 51/082* (2013.01); *B29C 51/087* (2013.01); *B29C 51/22* (2013.01); *B29C 51/24* (2013.01); *B29C 2791/001* (2013.01); *B29C 2791/002* (2013.01); *B29K 2311/12* (2013.01); *B29K 2311/123* (2013.01); *B29L 2031/712* (2013.01); *B31B 50/592* (2018.05)

(58) Field of Classification Search
CPC ........ B29C 2791/001; B29C 2791/002; B29K 2311/12; B29K 2311/123; B31B 50/44; B31B 50/592; B32B 38/12; B65D 1/26; B65D 1/34; B65D 75/326; B21D 22/22
See application file for complete search history.

(56) References Cited

U.S. PATENT DOCUMENTS

| | | | |
|---|---|---|---|
| 1,668,349 A * | 5/1928 | Baum ................... | B29C 51/087 215/325 |
| 1,967,245 A | 7/1934 | Hothersall | |
| 1,972,789 A | 9/1934 | Newkirk | |
| 2,484,656 A | 7/1945 | Sikka et al. | |
| 2,691,798 A | 10/1954 | Winchester et al. | |
| 2,927,409 A | 3/1960 | Don | |
| 2,949,639 A | 8/1960 | Woodward | |
| 2,953,814 A | 9/1960 | Mumford | |
| 3,026,566 A | 3/1962 | Guido et al. | |
| 3,115,678 A | 12/1963 | Rollin et al. | |
| 3,177,060 A | 4/1965 | Pedersen | |
| 3,181,202 A | 5/1965 | Guido et al. | |
| 3,302,441 A | 2/1967 | Bozek | |
| 3,329,306 A | 7/1967 | Stein | |
| 3,351,977 A | 11/1967 | Gasch et al. | |
| 3,443,412 A * | 5/1969 | Nelson ................... | B21D 13/02 72/348 |
| 3,494,169 A * | 2/1970 | Saunders ............... | B21D 22/22 72/350 |
| 3,584,109 A | 6/1971 | Meadors et al. | |
| 3,683,722 A | 8/1972 | Pears | |
| 3,692,456 A * | 9/1972 | Foster .................... | B29C 45/46 425/412 |
| 3,695,084 A * | 10/1972 | Siemonsen ............ | B65D 21/02 72/348 |
| 3,756,300 A | 9/1973 | Nalle | |
| 3,832,102 A | 8/1974 | Alroy | |
| 3,846,526 A | 11/1974 | Wade | |
| 3,910,415 A * | 10/1975 | Thiel ....................... | B65D 1/34 206/520 |
| 3,964,237 A * | 6/1976 | Johansen ............... | B29C 51/18 53/141 |
| 4,026,458 A | 5/1977 | Morris et al. | |
| 4,034,536 A | 7/1977 | Mahaffy et al. | |
| 4,036,926 A | 7/1977 | Chang | |
| 4,084,393 A * | 4/1978 | Focke ................... | B65B 19/226 493/164 |
| 4,105,736 A | 8/1978 | Padovani | |
| 4,124,434 A | 11/1978 | Wommelsdorf et al. | |
| 4,149,841 A | 4/1979 | Patterson | |
| 4,235,579 A | 11/1980 | Kurz et al. | |
| 4,250,686 A | 2/1981 | Fujio | |
| 4,369,885 A | 1/1983 | Redmond | |
| 4,381,909 A | 5/1983 | Ingraffea | |
| 4,449,350 A | 5/1984 | Sanford | |
| 4,588,539 A | 5/1986 | Rossi et al. | |
| 4,609,140 A | 9/1986 | Van Handel et al. | |
| 4,630,426 A | 12/1986 | Gentry | |
| 4,635,460 A | 1/1987 | Paunov et al. | |
| 4,637,811 A | 1/1987 | Fortney | |
| 4,690,666 A | 9/1987 | Alexander et al. | |
| 4,734,303 A * | 3/1988 | Fujiwara ................ | B32B 15/08 428/35.9 |
| 4,755,128 A | 7/1988 | Alexander et al. | |
| 4,764,241 A | 8/1988 | Makino et al. | |
| 4,909,393 A * | 3/1990 | Palisin, Jr. .......... | B21D 51/2646 206/519 |
| 4,932,856 A | 6/1990 | Merklinghaus et al. | |
| 4,994,229 A | 2/1991 | Flecknoe-Brown | |
| 4,996,864 A | 3/1991 | Enami | |
| 5,083,699 A | 1/1992 | Bulcher | |
| 5,187,966 A | 2/1993 | Seconde et al. | |
| 5,620,715 A | 4/1997 | Hart et al. | |
| 5,904,643 A | 5/1999 | Seeberger et al. | |
| 6,086,800 A | 7/2000 | Manlove et al. | |
| 6,093,460 A * | 7/2000 | Iwaya ................... | B31F 1/0087 156/224 |
| 6,315,150 B1 | 11/2001 | Takai et al. | |
| 6,440,354 B1 * | 8/2002 | Takai .................... | B29C 51/343 264/550 |
| 6,589,042 B2 | 7/2003 | Stämmler et al. | |
| 6,733,270 B2 | 5/2004 | Oster | |
| 7,101,168 B1 * | 9/2006 | Willemsen ............. | B29C 51/34 425/388 |
| 7,963,089 B2 | 6/2011 | Nelson et al. | |
| 8,464,871 B2 * | 6/2013 | Wnek ...................... | B65D 1/34 206/557 |
| 8,480,551 B2 * | 7/2013 | Wnek ..................... | B31B 50/59 493/42 |
| 8,544,671 B2 * | 10/2013 | Cerasani ................ | B65D 1/34 220/212 |
| 8,573,020 B2 | 11/2013 | Stodd | |
| 9,630,372 B2 * | 4/2017 | Takao .................... | B31F 1/0077 |
| 10,118,360 B2 | 11/2018 | Räsänen et al. | |
| 2001/0020757 A1 * | 9/2001 | Fried ...................... | B29C 33/34 264/443 |
| 2003/0026930 A1 | 2/2003 | Ferri et al. | |
| 2005/0189681 A1 | 9/2005 | Minganti | |
| 2006/0147240 A1 * | 7/2006 | Wolf ........................ | B41J 11/002 400/611 |
| 2007/0267374 A1 * | 11/2007 | Middleton ........... | B65D 43/169 211/126.1 |
| 2009/0072441 A1 | 3/2009 | Bracke | |
| 2010/0102482 A1 | 4/2010 | Jones et al. | |
| 2011/0195829 A1 | 8/2011 | Treccani et al. | |
| 2011/0252858 A1 | 10/2011 | Turner | |
| 2011/0272317 A1 | 11/2011 | Wnek et al. | |
| 2012/0184421 A1 | 7/2012 | Clougherty et al. | |
| 2013/0064998 A1 | 3/2013 | Wnek | |
| 2013/0256951 A1 | 10/2013 | Buehlmeyer et al. | |
| 2014/0374472 A1 | 12/2014 | Treccani et al. | |

FOREIGN PATENT DOCUMENTS

| | | |
|---|---|---|
| EP | 1115572 B1 | 7/2001 |
| EP | 2206658 A1 | 7/2010 |
| GB | 2 123 786 A | 2/1984 |
| JP | 200211043 A | 8/2000 |
| JP | 2001096646 A1 | 4/2001 |
| JP | 2001301064 | 10/2001 |
| JP | 2001301064 A | 10/2001 |
| JP | 2003312629 A1 | 11/2003 |

(56) References Cited

FOREIGN PATENT DOCUMENTS

| JP | 2006327629 A | 12/2005 |
|---|---|---|
| JP | 2007297082 A | 11/2007 |
| JP | 2010538925 | 12/2010 |
| JP | 2001322212 A | 11/2011 |
| KR | 19920000233 | 1/1992 |
| WO | WO2009036422 | 3/2009 |

OTHER PUBLICATIONS

Japanese Office Action for Japanese Application No. 2014-500956, dated Jan. 10, 2017.
PCT International Search Report for PCT/FI2013/050296, dated Jul. 3, 2013, 4 pgs.
Search Report issued in Finnish Application No. 20125304, dated Aug. 2, 2013, 1 pg.
PCT Written Opinion of the International Searching Authority for PCT/FI2013/050269, dated Jul. 3, 2013, 8 pgs.
Second PCT Written Opinion of the International Searching Authority for PCT/FI2013/050269, dated Apr. 10, 2014, 9 pgs.
PCT International Preliminary Report on Patentability for PCT/FI2013/050269, dated Jun. 18, 2014, 17 pgs.
Supplementary European Search Report for European Application No. 13765267,3, dated Feb. 16, 2016.
Korean Office Action issued by KIPO for Korean Application No. 10-2014-7029247 dated Apr. 1, 2019. English translation provided.
Canadian Office Action tor Canadian Applcaton No. 2,867,627 dated Nov. 7, 2019.
Korean Office Action for Korean Patent Application No. 10-2014-709247 transmittal dated Dec. 5, 2019, English translation provided.
Application and File History for U.S. Appl. No. 14/385,011, filed Sep. 12, 2014, inventors Räsänen et al.

* cited by examiner

DEEP-DRAWN PAPER TRAY, A METHOD AND AN APPARATUS FOR MAKING IT, AND A TRAY-FORMED PRODUCT PACKAGE

PRIORITY INFORMATION

This application is a divisional of application Ser. No. 14/385,011, filed Sep. 12, 2014, which is a National Phase entry of PCT Application No. PCT/FI2013/050296, filed Mar. 15, 2013, which claims priority to Finnish Application No. 20125304, filed Mar. 19, 2012, the disclosures of which are hereby incorporated by reference herein in their entirety.

FIELD OF THE INVENTION

The present invention relates to a deep-drawn paper tray, particularly a shallow tray made of paperboard or cardboard, a method and an apparatus for manufacturing such a tray by deep-drawing techniques, and a closed product package comprising the tray of the invention, particularly a heat-sealed gas- and liquid-tight food package.

DESCRIPTION OF RELATED ART

Packaging trays are used to a large extent for packages of fresh or ready-made foods. The tray may be made of polymer-coated heat-sealable paperboard or cardboard and closed with a heat-sealed polymer film or lid of polymer-coated board. The shelf life of fresh foods is only very short, and a leak proof and air-tight sealing is often required. Some foodstuffs also require a rather stiff packaging tray.

It is known to turn flat paperboard blanks into containers and trays for use in packages for food etc. Major problems in such a process is tearing the substrate during drawing and an uneven surface of the upper peripheral rim or flange of the tray due to wrinkling of the board as the tray is formed. Such wrinkles occur especially in the corners of trays of a generally rectangular shape, but also along the side walls and the peripheral flange of circular and oval trays. The wrinkles are a handicap in liquid- and air-tight sealing of the product package, prone to cause leaks between the tray flange and the rim of the lid sealed thereto.

An example of prior art trays and sealed covering lids is found from GB 2 123 786 A. Pressing of polyester coated board material to a tray-formed container has produced corrugations (wrinkles) extending from the corner side walls to the rim flange of the tray. A film cover following such irregularities in the flange surface has been heat-sealed to the rim flange to provide a leak-proof package.

U.S. Pat. No. 4,026,458 shows a rectangular container deep-drawn from a polymer-coated paperboard blank, wrinkled to have pleated folds in the corner side walls and rim flange of the container. The moulding tools for deep-drawing include an upper mandrel and a lower mold, which are movable in relation to each other for drawing the blank to the mold, to adopt the form of the container. Closing of the container is not discussed in U.S. Pat. No. 4,026,458, but obviously a polymer, or polymer-coated lid could be heat-sealed to the rim flange to obtain a sealed package.

EP 1 115 572 B1 is dealing with the potential leaking problem of sealed packages comprising a paper container with bending lines (wrinkles) in the corners and a lid heat-sealed to the annular edge (flange) of the container. The reference suggests use of a coating layer of a minimum thickness able to smooth any unevennesses in the corners and thereby avoid leaks through the wrinkles. Any more detailed teachings of the coating materials and layer thicknesses are missing from the reference, however.

JP 2000211043 A represents quite a different approach by describing a press-molded paper tray, said to have hardly any wrinkles stemming from the molding operation. The solution is use of a sheet of corrugated cardboard as a blank for forming the tray. Such technique is to no avail, however, when trays and sealed packages are made from ordinary paperboards and cardboard as required for usual food packages.

OBJECTS AND SUMMARY OF THE INVENTION

An aim of the present invention is to solve the problem of leaking corners and/or rim flanges of a sealed tray package by way of introducing a novel concept and technique for forming the deep-drawn paper tray. The different aspects of the present invention, all depending on the common inventive concept, are a method of forming the tray, an apparatus or tools for forming the tray, the tray resulting from the process, and a tray-formed package comprising the tray according to the present invention as well as a heat-sealed lid for closing the package.

According to the first aspect of the present invention, the problem is solved by a method of manufacturing a paper tray by deep-drawing, the method comprising the steps of (a) positioning a blank of paper between an upper and a lower moulding tools, (b) moving the moulding tools in relation to each other, to form a tray bottom and at least one step of upwardly expanding side walls surrounding the bottom, and (c) by multiplication of side wall step forming at a single or a plurality of working steps, moulding the side walls of the tray to have a concentrically stepped profile around the tray bottom.

Essentially, the concept of the present invention is to prevent the emergence of wrinkles typically extending over the entire height of the tray side walls, as has happened in the prior art due to the inability of the paper to adapt to the heavy deformation especially at the corners of the tray without bending to wrinkles. The solution, in a way, is to cut the upward deformation line that would otherwise produce the wrinkles into pieces short enough to let the paper adapt to the bending force without wrinkling. The length of such pieces, or the height of the steps in the tray side walls, could vary according to the paper material being used, but for usual paperboards or cardboards would be of the order of about 6 mm at maximum. The steps that form cuts to said deformation lines could be of at least about similar width, to level out tensions produced in the material before the next step repeating the deformation with its renewed tensions.

According to a preferred embodiment of the present invention at least one of the upper and lower moulding tools comprises a plurality of concentric frames, which are movable in relation to each other. The frames are brought to a stepped configuration to form the steps of the tray side walls one by one.

In the prior art the deep-drawing operation turning the flat blank to a finished tray has been carried out in a single step. The above-mentioned embodiment of the present invention constitutes a major break from this practice by performing the deep-drawing as a series of consecutive moulding steps.

In case only one of the moulding tools has the structure of concentric movable frames, the tool on the opposite side of the blank, or the tray being formed, could be a rigid workpiece having a stepped configuration corresponding to the side walls of the finished tray. Preferably the rigid workpiece would then be the upper moulding tool, the blank being pressed against it step by step from the underside by the lower moulding tool. However, both the upper and the lower moulding tools may comprise a plurality of concentric frames movable in relation to each other, and in this case the corresponding moving frames of the upper and lower moulding tools would be moved in tandem, to form the stepped side walls of the tray.

In the stepwise moulding of the tray as discussed above, the concentric steps of the tray side walls are preferably moulded by starting from the innermost step and then gradually proceeding to the outermost step beside the peripheral rim of the tray.

However, the present invention even includes an embodiment, in which the upper and lower moulding tools are both rigid stepped workpieces. In this case the tray is shaped at just a single deep drawing step.

Furthermore, beside individual blanks cut to the size of the tray the blanks may be provided by a continuous web of paper, which is being fed between the upper and lower moulding tools, and cut to individual finished trays after the moulding operation. An alternative approach to moulding the tray at a single working station by means of a single pair of upper and lower moulding tools is use of a first set of moulding tools travelling along a track, and a second set of moulding tools mounted at a number of working stations beside said track, the method comprising the steps of (a) supplying a blank of paper web material between a moulding tool of the first set and a moulding tool of the second set at a first working station, (b) moving said moulding tools at the first working station in relation to each other, to form a tray bottom and at least one step of upwardly expanding side walls surrounding the bottom, (c) retracting said moulding tools, (d) forwarding the moulding tool of said first set, together with the blank being moulded, to a second working station and aligning said tool with a working tool of said second set, (e) moving the moulding tools aligned at the second working station in relation to each other, to form at least one further step of upwardly expanding side walls of the tray, and retracting said moulding tools, (f) optionally repeating steps (d) and (e) at one or more further working stations, to obtain a tray with a plurality of concentric steps (4b, 4c, 4d) in the tray side walls surrounding the tray bottom, (g) releasing the finished trays at a tray collecting station, and (h) returning said moulding tool of said first set to the first working station.

Preferably the first set of moulding tools travelling along the track have the function of upper moulding tools, shaping the upside of the finished trays, and the second set at stationary working stations have the function of the lower moulding tools, shaping the underside of the finished trays, but having these roles reversed is fully possible as well.

The first set of moulding tools may be carried by a rotatable turret and the second set of moulding tools may be mounted at working stations along the periphery of the turret. The concentrical steps of the tray side walls are then formed one by one at the consecutive working stations along the periphery of the turret. However, the track of the first set of moulding tools need not be circular, but the working stations may be e.g. linearly arranged as well. In a continuous process there are as many trays proceeding at the different steps of the moulding process as there are working stations in the sequence. The paper may be supplied as a continuous web and cut to blanks at the first working station.

A still further modification of the process of the present invention is arranging a series of paired upper and lower moulding tools, which may be stationary, and having the blanks or a continuous web of paper to travel through said series, each pair of tools moulding one of the concentric steps of the side walls of the tray being formed.

The paper useful in the present invention is in particular paperboard or cardboard with a weight of 120 to 500 g/m$^2$, preferably of 170 to 350 g/m$^2$. To obtain a wrinkle-free tray the concentric steps in the tray side walls shall be dimensioned low enough to guarantee deformation without wrinkling as taught in the above. For said particular paperboards and cardboards the height of each step preferably is about 6 mm at most.

The second aspect of the present invention is an apparatus for deep-drawing a paper tray from a paper blank, designed to fulfill the inventive concept as discussed above. For the approach of a single pair of upper and lower moulding tools at a single working station, the apparatus comprises upper and lower moulding tools, which are movable in relation to each other and adapted to shape the blank from its opposite sides. Essentially both the upper and the lower moulding tool comprise a central area and a plurality of concentric zones around the central area in a stepped configuration. The central area is for forming the bottom of the tray, and the stepped zones around it lend a correspondingly stepped profile to the side walls of the tray being formed.

In an embodiment of the present invention, at least one of said upper and lower moulding tools, and preferably both of them, comprise a centerpiece and a plurality of concentric frames, which are movable in relation to the centerpiece and in relation to each other, the centerpiece receiving the bottom part of the blank and the tray being formed, and the frames being brought to a stepped configuration to form the steps of the side walls of the tray one by one.

In respect of moulding tools for paper trays, a prior art apparatus comprising parallel moulding elements, which are movable in relation to each other, has been shown in JP 2001096646 A. However, the elements are not concentric frames, and are arranged to shape the bottom of the tray, not the side walls as in the present invention. FIG. 1 of the JP 2001096646 A reference reveals that the rectangular tray still has the usual wrinkles in the corners. The wrinkling problem, or its solution as conceived by the present inventors are not discussed or suggested in JP 2001096646 A.

It is also possible that both the upper and the lower moulding tool are rigid stepped workpieces shaping the tray at a single deep drawing step. By combining the alternative structures, the apparatus according to the invention would comprise a rigid stepped workpiece as an upper moulding tool and an arrangement of a centerpiece and a plurality of surrounding movable frames as a lower moulding tool.

For the approach of a plurality of consecutive working stations, the apparatus according to the present invention comprises a first set of moulding tools travelling along a track, and a second set of moulding tools mounted at a number of working stations beside the track, the tools of said first set carrying paper blanks being moulded through the working stations and finished trays being released from the track at a tray collecting station, the respective moulding tools of the first and the second set at each working station being movable in relation to each other and adapted to shape the blank from its opposite sides, by forming a bottom and concentric steps to side walls of the tray one by one at the consecutive working stations. The apparatus may comprise a rotatable turret with a first set of moulding tools circumferentially arranged, and a second set of moulding tools mounted at a number of working stations along the periphery of the turret. The movement of the tools cooperating at each working station is preferably radial in relation to the turret axis, the tools opposite to the turret being retractable so as to free the blank to travel to the next working station. Preferably the moulding tools on the turret perimeter also serve to carry the blank forward between the working stations.

The third aspect of the present invention is a paper tray, which can be manufactured by use of the method and/or the working tools according to the present invention. The tray comprises a bottom and upwardly expanding side walls around the bottom, and characteristically for the present invention, the side walls of the tray are shaped to expand through a plurality of circumferential steps.

The paper used for the tray is typically polymer-coated paperboard or cardboard, preferably with a weight of 120 to 500 g/m$^2$, more preferably of 170 to 350 g/m$^2$. Generally, the height of each step of the side walls could be about 6 mm at most, preferably in the range of 3 to 6 mm, and more preferably in the range of 3 to 4 mm.

Regardless of the paper material for the tray, the steps should be dimensioned low enough for obtaining wrinkle-free side walls for the tray. For obtaining a liquid- and gas tightly sealed tray package it is particularly important that any wrinkles in the peripheral flange that forms the outermost step in the tray side wall are avoided.

The paper tray according to the present invention may have a rectangular, circular or oval shape. In each instance the wrinkle and leaking problems afflicting prior art trays and packages are avoided.

The fourth aspect of the present invention is a product package comprising a paper tray according to the third aspect as described in the above. Characteristic for the package is that the tray comprises a bottom, upwardly expanding side walls around the bottom, and a flat peripheral flange, that the side walls of the tray are shaped to expand through a plurality of circumferential steps, and that a lid is liquid- and gas-tightly heat-sealed to the flange of the tray.

The tray as well as the heat-sealed lid may be made of polymer-coated paperboard or cardboard. Alternatively the lid may be a heat-sealed polymer film cover. Within the present invention, the specific embodiments of the tray as described above similarly constitute specific embodiments of the product package as such trays are employed thereto.

The stepped configuration of the tray side walls set a practical limit to the steepness of the side walls. For this reason the trays according to the present invention are best suited for relatively flat or shallow tray-packages, which may be used as consumer packages of ready-made foods, sliced cheese and meat products, vegetables, chocolates etc., which correspond to the shape or nature of the packed product, or where a good visibility of the product through a transparent plastic cover is desirable.

BRIEF DESCRIPTION OF THE DRAWINGS

FIGS. 1 to 4 are a schematic representation showing the consecutive steps of a process for deep-drawing a paper tray between upper and lower moulding tools according to certain aspects of the present invention. More particularly.

DESCRIPTION OF THE EMBODIMENTS SHOWN IN THE DRAWINGS

Figure 1:
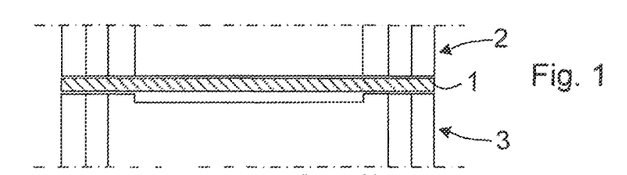
FIG. 1 shows a cross-sectional view of a paper blank positioned between the moulding tools at the start of the process.

In the deep-drawing process according to FIGS. 1 to 4 a flat rectangular blank 1 of polymer-coated paperboard is turned to a relatively shallow rectangular tray 4 between a pair of moulding tools 2, 3. FIG. 1 shows the initial position, the blank 1 positioned between an upper moulding tool 2 and a lower moulding tool 3. The upper moulding tool 2 has a rectangular centerpiece 2*a*, which is surrounded by a series of concentric rectangular frames 2*b*, 2*c*, 2*d*, the centerpiece and the frames being movable in relation to the lower moulding tool 3 and in relation to each other. The centerpiece 2*a* faces to the bottom 4*a* of the tray that is being formed. The frames 2*b*, 2*c* and 2*d* are facing to three concentric steps 4*b*, 4*c* and 4*d* of the side walls of the tray being formed, the innermost frame 2*b* facing to the innermost step 4*b*, the middle frame 2*c* facing to the middle step 4*c*, and the outermost frame 2*d* facing to the outermost step 4*d*. Opposite to the parts of the upper moulding tool 2, on the reverse side of the tray being formed, the lower moulding tool 3 comprises corresponding parts 3*a*-3*d*, namely a rectangular central area 3*a* surrounded by a series of concentric rectangular frames 3*b*, 3*c* and 3*d*. The central area 3*a* is integral with the innermost frame or zone 3*b*, recessed in relation thereto, while the middle and outermost frames 3*c*, 3*d* are separate parts movable in relation to the central part 3*a*, 3*b* and each other. Thus, opposite to the centerpiece 2*a* of the upper tool there is a central area 3*a* of the lower tool, opposite to the innermost frame 2*b* of the upper tool there is an innermost frame or zone 3*b* of the lower tool, opposite to the middle frame 2*c* of the upper tool there is a middle frame 3*c* of the lower tool, and opposite to the outermost frame 2*d* of the upper tool there is a outermost frame 3*d* of the lower tool.

Figure 2:
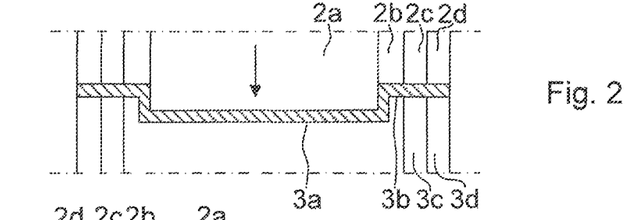
FIG. 2 shows a cross-sectional view of a molding of a first step to the side walls of the tray being formed.

In the start position of the deep-drawing process as shown in FIG. 1 the parts of the upper and the lower moulding tools 2, 3 are positioned level on both sides of the blank 1. As the first step, the centerpiece 2*a* of the upper tool is drawn downward to a snug fit with the recessed central area 3*a* of the lower tool, as shown in FIG. 2. The bottom 4*a* and the innermost step 4*b* surrounding the bottom are thereby formed to the blank 1. At the next step the innermost part 3*a*, 3*b* of the lower tool and the centerpiece 2*a* and the innermost frame 2*b* surrounding the centerpiece of the upper tool are drawn downward to enter the position shown in FIG. 3, the middle step 4*c* of the forthcoming tray are thus formed to the blank. The last step, as represented by FIG. 4, comprises downward movement of all the tool 2, 3 parts except the respective outermost frames 3*d* and 4*d*, to form the outermost step 4*d* to the tray, this outermost step constituting a flat rim flange 4d to the finished tray 4. The upper and lower moulding tools 2, 3 are then separated by sufficient reverse movement in relation to each other, to let the finished tray 4 be removed.

Instead of the integrated centerpiece 3a, 3b of the lower moulding tool, the zone 3b surrounding the central area 3a could be a separate movable frame similar to the movable middle and outer frames 3c and 3d, or the innermost frame 2b of the upper moulding tool. In this instance the upper and lower moulding tools would be identical, and level at the initial position of the process. The first downward strike of the centerpiece 2a of the upper tool would be accompanied by a corresponding downward movement of the centerpiece 3a of the lower tool, reaching a recessed position corresponding to that in FIG. 2.

Instead of the moulding tools 2, 3 consisting of movable parts 2a-2d, 3b-3d, the upper and lower moulding tools may be designed as single pieces, their respective overall configurations corresponding to the tool part positions in FIG. 4. Such rigidly constructed tools allow the tray being formed at a single deep-drawing step.

Furthermore, the individual blanks 1 as shown in FIG. 1, cut to the size of the tray, may be replaced by use of a continuous web of paper, which is being fed between the upper and lower moulding tools 2, 3, and cut to individual trays 4 first after the moulding operation.

Figure 5:
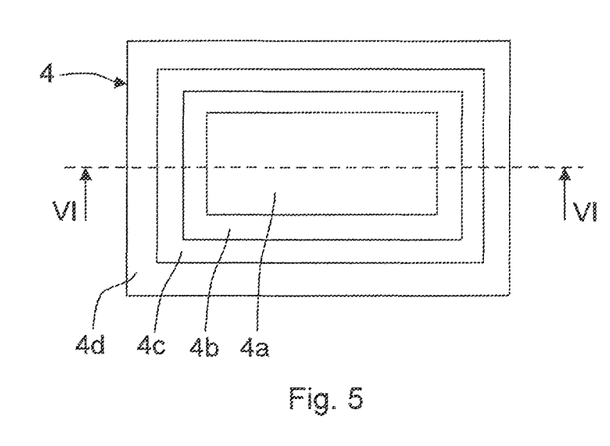
FIG. 5 shows a topside perspective view of a finished tray produced according to FIGS. 1 to 4.
Figure 6:
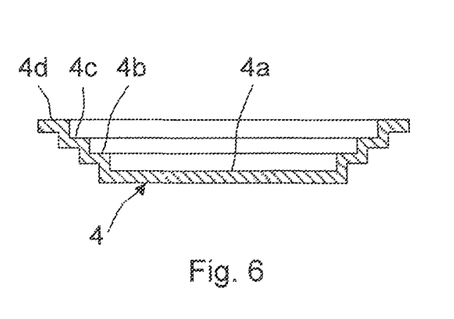
FIG. 6 shows a cross-sectional view of the tray along the line VI-VI in FIG. 5.

The finished tray 4 is shown from the upside and in cross-sectional side elevation in FIGS. 5 and 6, respectively. Preferred material for the tray is paperboard or cardboard of a weight of 170 to 350 g/m$^2$, with a coating of heat-sealable polymer such as polyolefin or polyester at least on the upside (inside) coming into contact with a product. Preferably there is a polymer coating on both sides of the tray.

The height of the steps 4b, 4c, 4d is preferably about 6 mm at most, more preferably in the range of 2 to 6 mm. Steps as low as these can be formed by deforming the board at the bends without wrinkling it at the corners of the rectangular tray, as has happened in the prior art paper trays formed at a single deep-drawing step. Also trays with a rounded overall form, circular or oval, can be moulded without wrinkling in the stepped side walls and the outermost rim flange. A perfectly flat unwrinkled rim flange is thus achieved for rectangular as well as rounded paper trays, allowing liquid- and gas-tight sealing of a lid to the flange without the previous leak problems, or excessive use of coating polymer to avoid any leakages.

According to the present invention in general, the number of the steps 4b, 4c . . . in the side walls of the tray is at least two, while there is no upper limit. Three steps as shown in the figures is suitable for shallow trays, useful for cold-cut food packages. By increasing the number of steps the depth of the tray is increased accordingly. The height and width of the steps may vary, and need not be the same for each step. The outermost step 4d forming the rim flange may be wider than the inner steps, to provide for secure heat-sealing of a covering lid. As noted, the general form of the tray may be rectangular as in FIGS. 5 and 6, with slightly rounded corners as may be desirable to help avoiding the wrinkles, or it may be circular or oval. Even unsymmetrical or otherwise irregular forms are possible, and more than one tray-formed recesses may be worked to a single item of paper according to the teachings of the present invention, by use of the same or different moulding tools, simultaneously or in sequence.

Figure 7:
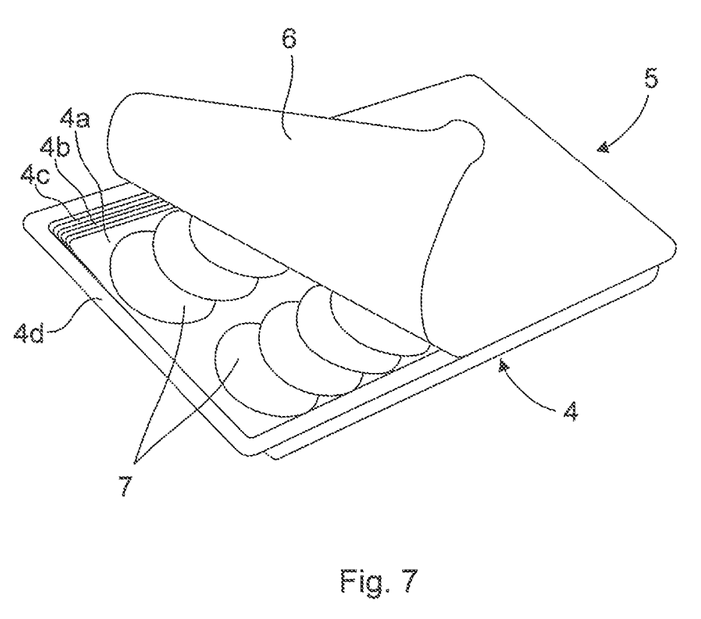
FIG. 7 shows a perspective view of a sealed product package comprising the tray of FIGS. 5 and 6, partially opened and with the products partially visible.

The tray 4 according to FIGS. 5 and 6 is especially suited for use in sealed product packages 5, such as the one shown in FIG. 7. A lid 6 of transparent polymer film has been heat-sealed to the polymer-coated rim flange 4d of the tray, to form a liquid and gas tight package 5. FIG. 7 shows the package partially opened, by peeling the lid from a lug in the corner, for access to the product, typically cold cuts such as sliced meat or cheese 7 in this instance.

Due to the steps in the tray side walls being quite low, the overall form of the trays will be shallow, suitable for packaging ready-made foods such as sliced cheese, cold-cut meat (sliced ham and other charkurtery), fish, vegetables, sweets etc. The tray is even useful for consumer packages of products other than food. Instead of film, polymer coated board similar to that of the tray may be used for a sealable lid. Covers of polymer film in particular need not be flat but may be convex or adapt to the shape of the product, thus increasing the volume of the finished package.

Figure 8:
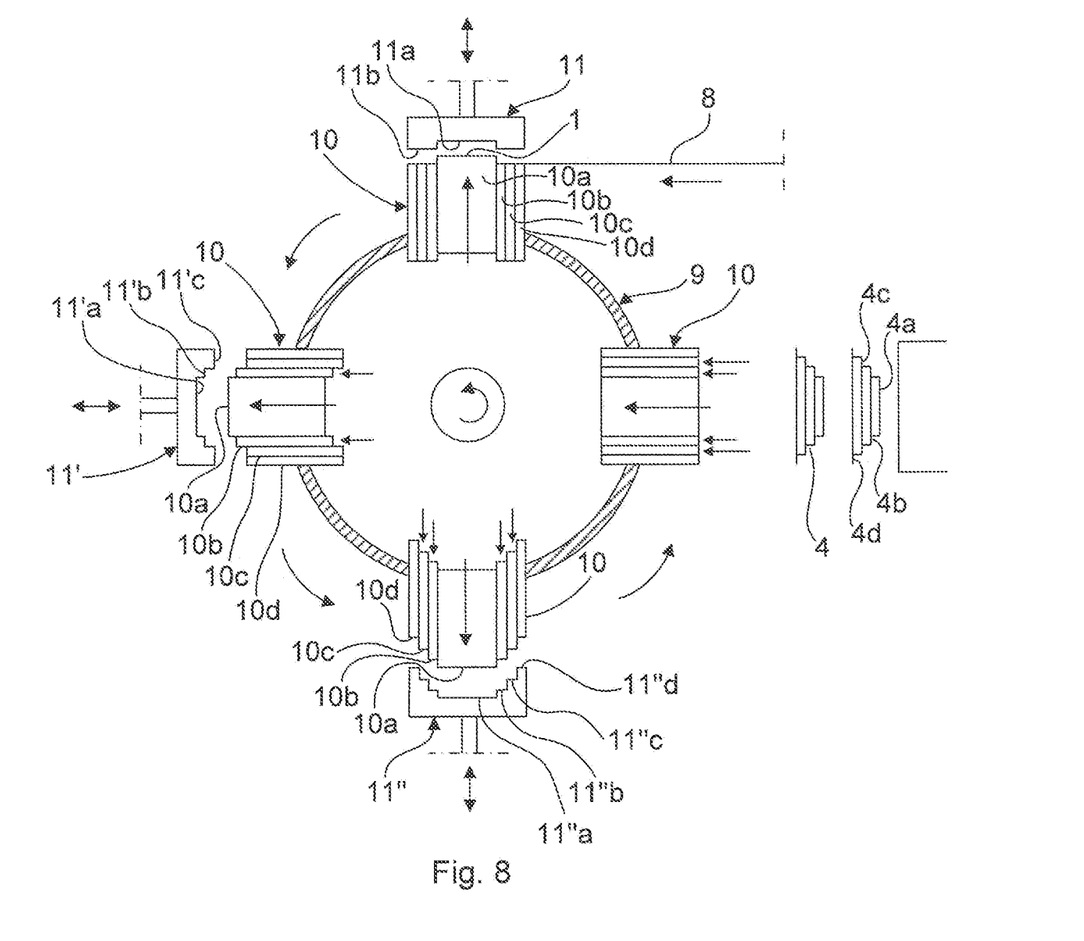
FIG. 8 shows a schematic view of an alternative moulding process for the manufacture of paper trays according to the present invention.

In FIG. 8 there is shown an alternative technique for forming trays 4 according to the present invention, in which a continuous web 8 of paper is cut to blanks, which are travelling through a sequence of working stations and moulded into trays step by step at these stations. According to FIG. 8 the apparatus comprises a rotatable turret 9 with radially movable moulding tools 10 along its perimeter, their number depending on the number of working steps in the process. The construction and working of each moulding tool 10 on the turret 9 correspond to that described for the upper moulding tool 2 in connection with FIGS. 1 to 4. A number of rigid mould plates 11 mounted on radially retractable shafts 12 at respective counterpositions are arranged along the periphery of the rotating turret 9. At the consecutive working stations the concentric steps 4b, 4c, 4d of the side walls of the tray 4 are formed one by one, from the innermost step to the outermost step, while the blank carried by the turret 9 is travelling through these stations.

At the first working station one of the moulding tools 10 of the turret 9 is cooperating with a peripherally located mould plate 11 having a recess 11a and a surrounding frame 11b, designed to form the bottom 4a and the innermost step 4b surrounding the bottom of the tray being formed. The frame 11b is provided with a cutting edge detaching a blank from the web 8, to be turned into a tray in the moulding process. The tool 10, with its parts levelled, and the mould plate 11 are brought into contact with the blank 8 on both sides, and the moving centerpiece 10a of the tool is drawn to a snug fit with the recess 11a of the mould plate, to define the tray bottom 4a and form the innermost step 4b of the tray side wall, while the blank is otherwise held in place by the frames 10b, 10c, 10 d and 11b of the tool 10 and the plate 11. Functionally this first working step corresponds to the step described and shown in FIG. 2. After the strike of the tool centerpiece 10a the mould plate 11 is retracted, as shown in FIG. 8, to let the turret with the aid of suction means (not shown) carry the blank with the freshly formed tray bottom to the second working station.

Figure 3:
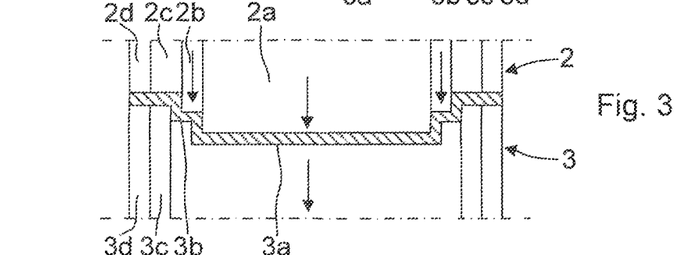
FIG. 3 shows a cross-sectional view of a molding of a second step to the side walls of the tray being formed.
Figure 4:
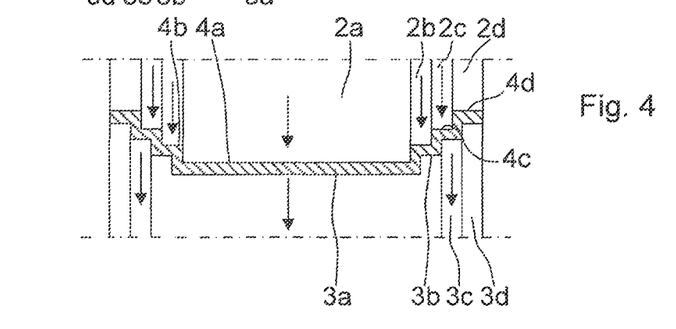
FIG. 4 shows a cross-sectional view of a molding of a third and outermost step to the side walls of the tray being formed.

In the meantime, at the second working station a second step 4c is formed to the side wall of a forthcoming tray, generally in the manner described and shown in connection with FIG. 3. A moulding tool 10, which has already performed the first moulding step at the first position and carried the blank to this second station, contacts the blank from the tray upside and a rigid mould plate 11' having a recess 11'a with a circumferential step 11'b, is brought into contact with the blank 8 from the underside, and the centerpiece 10a together with the innermost frame 10b of the moulding tool 10 are drawn to a snug fit with the mould plate 11', while an outer frame 11'c of the mould plate and the outer frames 10c, 10d hold the blank in place. The mould plate 11' is then retracted as shown in FIG. 8, and the blank carried by the turret 9 will continue to the third working station.

At the third working station a moulding tool 10 and a retractable mould plate 11" are designed and operated to form a third step 4*d* to the tray side wall in an analogous manner. The mould plate 11" having a recess 11"*a* with two circumferential steps 11"*b*, 11"*c* is brought into contact with the blank underside, and the centerpiece 10*a* together with the innermost and middle frames 10*b*, 10*c* of the moulding tool 10 are drawn to a snug fit with the mould plate 11', while an outer frame 11"*d* of the mould plate 11" and the outermost frame 10*d* of the moulding tool 10 hold the blank in place. The mould plate 11" is retracted as shown in FIG. 8, and the ready-moulded tray 4 is released from the turret 9 and stacked at a final tray collecting station. The moulding tool 10 freed from the tray is retracted to the level position and returns to the first working station for repeating the working cycle.

Figure 9:
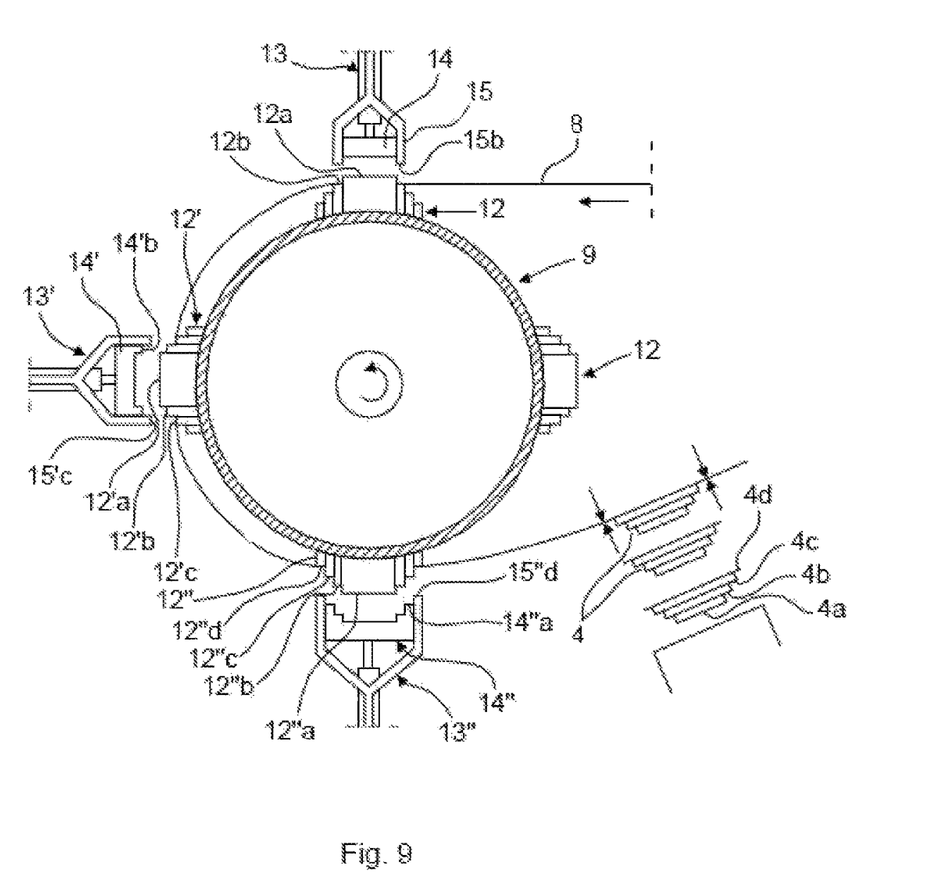
FIG. 9 shows a schematic view of a modification of the process of FIG. 8.

FIG. 9 shows a modification of the process of FIG. 8, in which, by and large, the positions of the moulding tool and the mould have been reversed, the turret 9 carrying rigid mould pieces 12 on its perimeter, and radially moving moulding tools 13 being arranged at consecutive working stations along the periphery of the rotating turret. Furthermore, instead of cutting the paper web 8 into blanks at the first working station, the ready-moulded trays 4 are shown as being separated from the web first at the final collecting station.

The mould pieces 12 of the turret 9 have a protruding stepped configuration corresponding the recessed upside of the paper trays 4 being produced. The moulding tools 13 at the working stations each comprises a rigid centerpiece 14 and a surrounding frame 15, which is movable in respect of the centerpiece. The frames 15 are designed to form the concentric steps 4*b*, 4*c*, 4*d* of the tray side walls one by one at the respective working stations.

At the first working station the overmost central area 12*a* of the mould piece 12 and the moulding tool 13, with the flat centerpiece 14*a* and the surrounding frame 15*b* levelled, contact the paper web 8 from its opposite sides, and the frame 15*b* is then driven against the first step 12*b* of the mould piece 12 to form the tray bottom 4*a* and the innermost step 4*b* of the tray side wall. The moulding tool 13 is then retracted to the position shown in FIG. 9, to let the turret 9 move the web to the second working station.

In the meantime, at the second working station a moulding tool 13' has a rigid framed centerpiece 14' having a configuration corresponding to the bottom and the innermost step of the forthcoming tray and a movable frame 15'*c*. The moulding tool 13', with the frame 14'*b* of the rigid centerpiece 14' and the movable frame 15'*c* levelled, is brought against the respective mould piece 12' and the web therebetween, and the movable frame 15'*c* is driven against the second step 12'*c* of the mould piece 12' to form the middle step 4*c* of the tray side wall. The moulding tool 13' is then retracted as shown in FIG. 9, to let the turret 9 move the web to the third working station.

At the third working station a mould piece 12" and a retractable moulding tool 13" are designed and operated to form a third step 4*d* to the tray side wall in an analogous manner. The moulding tool 13", with an outer frame 14"*c* of a stepped centerpiece 14" and a movable frame 15"*d* leveled, is brought against the respective mould piece 12" and the web therebetween, and the movable frame 15"*d* is then driven against the third step 12"*d* of the mould piece 12" to form the outermost step 4*d* of the tray side wall. The moulding tool 13" is retracted as shown in FIG. 8, and the web carrying the ready-moulded tray is separated from the turret 9 and cut to individual finished trays 4 stacked at the final collecting station. The mould piece 12 freed from the web returns to the first working station for repeating the working cycle.

The processes shown in FIGS. 8 and 9 may be modified so that instead of a rotating turret the working stations are otherwise arranged, for instance beside a linear track, while the first set of moulding tools, after release of the finished trays, are returned via a parallel track back to the first station. With the working stations arranged shoulder to shoulder, the web may be cut into trays first after the moulding steps, according to the principle of FIG. 9, the uncut web helping to steer the process without marked loss of web material.

The invention claimed is:

1. A method of manufacturing a paper tray by deep-drawing, the method comprising the steps of:
   positioning a blank of paper between an upper moulding tool and a lower moulding tool;
   moving the upper and lower moulding tools in relation to each other, to form a tray bottom and at least one upwardly expanding side walls surrounding the tray bottom; and
   moulding the at least one upwardly expanding side walls surrounding the tray bottom to more than two side wall steps having a concentrically stepped profile around the tray bottom, each of the more than two side wall steps having a concentrically stepped profile being dimensioned to have a height of at most 6 mm and providing wrinkle-free side walls for the tray;
   wherein each of the more than two side wall steps has a substantially right-angled configuration formed in relation to a plane of the tray bottom;
   wherein moulding the upwardly expanding side walls surrounding the tray bottom to the two or more side wall steps is formed by more than two working steps; and
   wherein at least one of the upper and lower moulding tools comprises a plurality of concentric frames that are movable in relation to each other, the plurality of concentric frames being brought to a stepped configuration to form the more than two side wall steps of the tray side walls one by one.

2. The method of claim 1, wherein the concentric frames of one or both of the upper and lower moulding tools are moved to form the concentric steps of the tray side walls one by one, proceeding from the innermost step to the outermost step.

3. The method of claim 1, wherein the concentrically stepped profile of the more than two side wall steps of the tray corresponds to a concentrically stepped configuration of the upper and the lower moulding tools.

4. The method of claim 3, wherein both the upper and the lower moulding tools comprise a plurality of concentric frames movable in relation to each other, to form the more than two side wall steps of the tray step by step.

5. The method of claim 3, wherein the upper and lower moulding tools are both rigid stepped workpieces shaping the tray step by step.

6. The method of claim 1, wherein the upper moulding tool comprises a rectangular centerpiece surrounded by a plurality of concentric rectangular frames, and wherein the moulding step comprises moving the rectangular centerpiece and the plurality of concentric rectangular frames in relation to the lower moulding tool.

7. The method of claim 6, wherein the lower moulding tool comprises a rectangular central area surrounded by a plurality of concentric rectangular frames, and wherein the rectangular central area of the lower moulding tool corresponds to the rectangular centerpiece of the upper moulding tool, and each of the plurality of concentric rectangular frames of the lower moulding tool correspond to at least one of the plurality of concentric rectangular frames of the upper moulding tool during the moulding step.

8. The method of claim 7, wherein the moulding step provides the concentrically stepped profile of the more than two side walls of the tray corresponding to a concentrically stepped configuration of the upper and the lower moulding tools.

9. The method of claim 6, wherein the more than two working steps comprises the concentric frames of one or both of the upper and lower moulding tools being moved to form the concentric steps of the tray side walls one by one, proceeding from the innermost step to the outermost step.

10. The method of claim 9, wherein the more than two working steps further comprises moving one or both of the rectangular central area of the lower moulding tool and the rectangular centerpiece of the upper moulding tool as the innermost step.

11. The method of claim 1, wherein the paper is paperboard or cardboard with a weight of 120 to 500 g/m².

12. The method of claim 1, wherein the method comprises using a first set of moulding tools travelling along a track, and a second set of moulding tools mounted at a number of working stations beside said track, and wherein the method comprises:
  (a) supplying the blank of paper comprising a blank of paper web material between a moulding tool of the first set and a moulding tool of the second set at a first working station;
  (b) moving said moulding tools at the first working station in relation to each other, to form the tray bottom and the at least one step of upwardly expanding side walls surrounding the tray bottom;
  (c) retracting said moulding tools;
  (d) forwarding the moulding tool of said first set, together with the blank being moulded, to a second working station and aligning said moulding tool of said first set with a working tool of said second set;
  (e) moving the moulding tools aligned at the second working station in relation to each other, to form at least one further step of upwardly expanding side walls of the tray, and retracting said moulding tools;
  (f) optionally repeating steps (d) and (e) at one or more further working stations, to obtain a tray with the more than two concentric steps in the tray side walls surrounding the tray bottom;
  (g) releasing the finished trays at a tray collecting station; and
  (h) returning said moulding tool of said first set to the first working station.

13. The method of claim 12, wherein said first set of moulding tools are carried by a rotatable turret and said second set of moulding tools are mounted at working stations along the periphery of the turret.

14. The method of claim 13, wherein the concentrical steps of the tray side walls are formed one by one at the consecutive working stations along the periphery of the turret.

15. The method of claim 14, wherein the paper is supplied as a continuous web and cut to blanks at the first working station.

* * * * *